US012784336B2

(12) United States Patent
Chen et al.

(10) Patent No.: US 12,784,336 B2
(45) Date of Patent: Nov. 3, 2026

(54) PERFORATION INFORMATION PROCESSING METHOD AND DEVICE FOR BONE SCAFFOLD MODEL

(71) Applicant: SHANGHAI JIAO TONG UNIVERSITY, Shanghai (CN)

(72) Inventors: Xiaojun Chen, Shanghai (CN); Haochen Shi, Shanghai (CN); Enpeng Wang, Shanghai (CN); Jun Fang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 1036 days.

(21) Appl. No.: 17/790,689

(22) PCT Filed: Dec. 25, 2020

(86) PCT No.: PCT/CN2020/139464
§ 371 (c)(1),
(2) Date: Mar. 22, 2023

(87) PCT Pub. No.: WO2021/136094
PCT Pub. Date: Jul. 8, 2021

(65) Prior Publication Data
US 2023/0320859 A1 Oct. 12, 2023

(30) Foreign Application Priority Data
Jan. 3, 2020 (CN) ......................... 202010005911.9

(51) Int. Cl.
*G06T 17/10* (2006.01)
*G06T 17/00* (2006.01)

(52) U.S. Cl.
CPC .................................... *G06T 17/00* (2013.01)

(58) Field of Classification Search
None
See application file for complete search history.

(56) References Cited

U.S. PATENT DOCUMENTS 10,278,823 B1 * 5/2019 Xue ...................... A61F 2/3662
10,635,088 B1 * 4/2020 Bandara ............... G05B 19/182
(Continued)

FOREIGN PATENT DOCUMENTS

CN 102087676 6/2011
CN 102973334 3/2013
(Continued)

OTHER PUBLICATIONS

Sun, W., Starly, B., Darling, A., & Gomez, C. (2004). Computer-aided tissue engineering: application to biomimetic modelling and design of tissue scaffolds. Biotechnology and applied biochemistry, 39(1), 49-58. (Year: 2004).*
(Continued)

*Primary Examiner* — Ian L Lemieux
(74) *Attorney, Agent, or Firm* — HSML P.C.

(57) ABSTRACT

The present invention relates to a perforation information processing method and device for a bone scaffold model. The method includes: step S1: importing a nonporous-bone-scaffold initial model; step S2: segmenting the nonporous-bone-scaffold initial model into a plurality of unit lattices according to an input signal; and step S3: perforating each of the unit lattices, to obtain a porous bone scaffold model. Compared with the related art, in the present invention, users have great autonomy in design and can completely customize the lattice structure, and the core computation steps can be highly parallelizable, which can greatly reduce the time required for computation.

2 Claims, 2 Drawing Sheets

(56) References Cited

U.S. PATENT DOCUMENTS

| | | | | |
|---|---|---|---|---|
| 2013/0268085 | A1* | 10/2013 | Dong | A61F 2/30767 703/1 |
| 2014/0363481 | A1 | 12/2014 | Pasini et al. | |
| 2015/0230874 | A1* | 8/2015 | Musuvathy | G06T 17/20 703/1 |
| 2018/0280141 | A1* | 10/2018 | Jones | A61F 2/3094 |
| 2019/0240029 | A1* | 8/2019 | Choi | A61F 2/30942 |
| 2020/0134918 | A1* | 4/2020 | Wang | G06T 15/08 |
| 2020/0179123 | A1* | 6/2020 | Steinmann | A61F 2/34 |
| 2022/0310243 | A1* | 9/2022 | Bressner | G16H 40/63 |

FOREIGN PATENT DOCUMENTS

| | | |
|---|---|---|
| CN | 109622958 | 4/2019 |
| CN | 111223179 | 6/2020 |

OTHER PUBLICATIONS

International Search Report and Written Opinion for PCT Application No. PCT/CN2020/139464 dated Mar. 26, 2021 (Year: 2021).*

Wu, N., Li, S., Zhang, B., Wang, C., Chen, B., Han, Q., & Wang, J. (2021). The advances of topology optimization techniques in orthopedic implants: a review. Medical & Biological Engineering & Computing, 59(9), 1673-1689. (Year: 2021).*

William Chanatry. (Mar. 11, 2021). Design with a Purpose: Introduction into Lattice Structures. [online] [retrieved Mar. 11, 2026] <URL:https://blogs.sw.siemens.com/nx-design/design-with-a-purpose-introduction-into-lattice-structures/> (Year: 2021).*

Maconachie, T., Leary, M., Lozanovski, B., Zhang, X., Qian, M., Faruque, O., & Brandt, M. (2019). SLM lattice structures: Properties, performance, applications and challenges. Materials & Design, 183, 108137. (Year: 2019).*

Wu, J., Aage, N., Westermann, R., & Sigmund, O. (2017). Infill optimization for additive manufacturing—approaching bone-like porous structures. IEEE transactions on visualization and computer graphics, 24(2), 1127-1140. (Year: 2017).*

Sethian, J. A. (1996). A fast marching level set method for monotonically advancing fronts. proceedings of the National Academy of Sciences, 93(4), 1591-1595. (Year: 1996).*

Lorensen, W. E., & Cline, H. E. (1998). Marching cubes: A high resolution 3D surface construction algorithm. In Seminal graphics: pioneering efforts that shaped the field (pp. 347-353). (Year: 1998).*

Yoo, D. J. (2011). Porous scaffold design using the distance field and triply periodic minimal surface models. Biomaterials, 32(31), 7741-7754. (Year: 2011).*

Foroughi, A. H., Valeri, C., & Razavi, M. J. (2025). A review of computational optimization of bone scaffold architecture: methods, challenges, and perspectives. Progress in Biomedical Engineering, 7(1), 012003. (Year: 2025).*

International Search Report issued in International Application No. PCT/CN2020/139464, Mar. 26, 2021, 7 pages w/ translation.

* cited by examiner

S1: importing a nonporous-bone-scaffold initial model
S2: segmenting the nonporous-bone-scaffold initial model into a plurality of unit lattices according to an input signal
S3: perforating each of the unit lattices, to obtain a porous bone scaffold model
FIG. 1
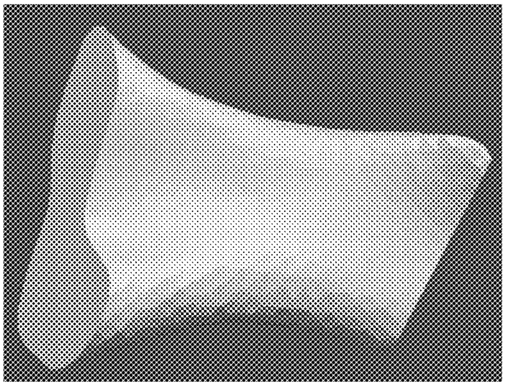
FIG. 2
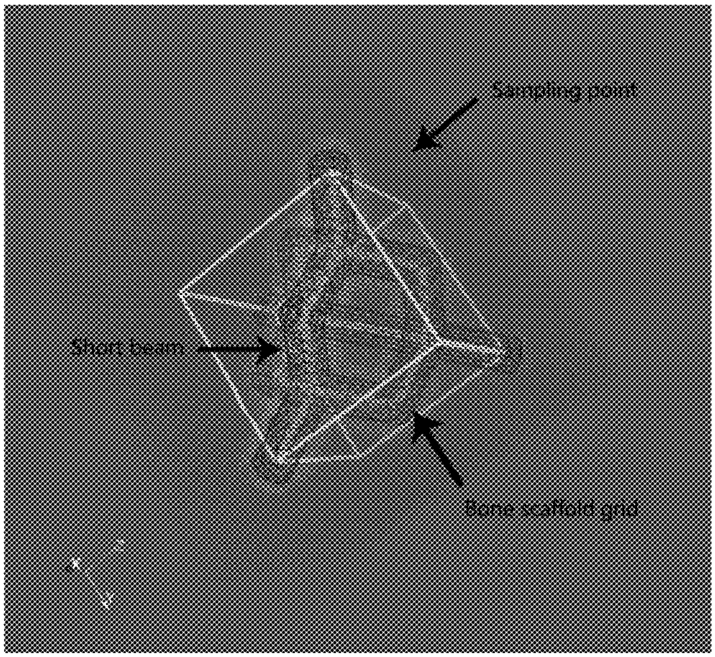
FIG. 3

PERFORATION INFORMATION PROCESSING METHOD AND DEVICE FOR BONE SCAFFOLD MODEL

The present application Claims for the priority benefit of the Chinese Patent Application CN 202010005911.9 with the Application Date of Jan. 3, 2020. The present application makes reference to the full text of the Chinese Patent Application above.

BACKGROUND OF THE INVENTION

Technical Field

The present invention relates to a computer technology, in particular to a perforation information processing method and device for a bone scaffold model.

Description of Related Art

In bone defect repair treatment, to repair the damaged bone structure, a bone scaffold needs to be designed and surgically implanted into the patient's body. With the progress of research, it has been found that a bone scaffold with a porous structure can be combined with the host bone in a biological form, and the porosity, the pore size and the pore pattern of the porous structure of the bone scaffold all affect the combination in the biological form.

In the related art, methods of material science are mostly used to manufacture bone scaffolds with a porous structure through a special process, but the internal structures of the porous bone scaffolds generated by this method are uncertain.

Many researchers use computer-aided modeling methods to design bone scaffolds with a porous structure, and some of them use the three-dimensional model Boolean operation method to cut infarctate bone scaffold models by using a long cylinder or long rectangle from all directions. However, these methods require a large quantity of computation and are difficult to parallelize.

BRIEF SUMMARY OF THE INVENTION

An objective of the present invention is to overcome the defects in the related art, thereby providing a perforation information processing method and device for a bone scaffold model.

The objective of the present invention can be implemented by using the following technical solutions:

A perforation information processing method for a bone scaffold model includes:

step S1: importing a nonporous-bone-scaffold initial model;

step S2: segmenting the nonporous-bone-scaffold initial model into a plurality of unit lattices according to an input signal; and step S3: perforating each of the unit lattices, to obtain a porous bone scaffold model.

For a single unit lattice, step S3 specifically includes:

step S31: drawing a first quantity of short girders in the unit lattice, to form a porous lattice template, wherein the first quantity is received from an input device;

step S32: generating equidistant sampling points according to a specified sampling pitch in a model space in which the nonporous-bone-scaffold initial model is located;

step S33: calculating shortest distances between each of the sampling points and all the short girders; and step S34: extracting, according to the generated sampling points, an isosurface according to a specified short girder cylinder radius by using an isosurface extraction algorithm, to perforate the unit lattices.

Step S31 specifically includes:

step S311: selecting a plurality of key points in a cube range from coordinates (0, 0, 0) to (1, 1, 1);

step S312: creating line segments between the generated key points, to form the short girders in the unit lattice; and step S313: checking whether there is a key point, of which a connectivity is still 1 after the lattices are laid densely, among the key points generated in step S21 in the structural diagram of the line segments generated in step S22, and returning to step S21 to regenerate key points if there is, otherwise, performing step S32.

Step S33 specifically includes:

step S331: scaling a dimension of the unit lattice to a specified dimension, and densely filling the scaled unit lattices in the model space;

step S332: assigning an initial value+∞ to distances of all the sampling points generated in step S32 in a distance field;

step S333: traversing all lattices that are filled in step S331 and that possibly contribute to the shortest distances of the sampling points generated in step S3 in the distance field; and step S334: traversing short girders in all the lattices traversed in step S333, if the short girder is completely inside the nonporous-bone-scaffold initial model, updating shortest distance values of sampling points in a specified range near the short girder, if a part of the short girder is inside the nonporous-bone-scaffold initial model, calculating the part of the short girder inside the nonporous-bone-scaffold initial model, and updating the shortest distance values of the sampling points in a specific range nearby the part for the part.

Values in each region in step S334 are updated concurrently and independently.

A perforation information processing device for a bone scaffold model, includes a processor, a memory a program stored in the memory and performed by the processor, where when performing the program, the processor performs the following steps:

step S1: importing a nonporous-bone-scaffold initial model;

step S2: segmenting the nonporous-bone-scaffold initial model into a plurality of unit lattices according to an input signal; and step S3: perforating each of the unit lattices, to obtain a porous bone scaffold model.

Compared with the related art, the present invention has at least one of the following advantages.

1) Users have great autonomy in design and can completely customize the lattice structure.

2) The core computation steps can be highly parallelizable, which can greatly reduce the time required for computation.

BRIEF DESCRIPTION OF THE SEVERAL VIEWS OF THE DRAWINGS

FIG. 1 is a schematic flowchart of main steps of a method according to the present invention;

FIG. 2 is a schematic diagram of a nonporous bone scaffold model;

FIG. 3 is a structural diagram of a lattice in a porous bone scaffold; and

DETAILED DESCRIPTION OF THE INVENTION

Figure 4:
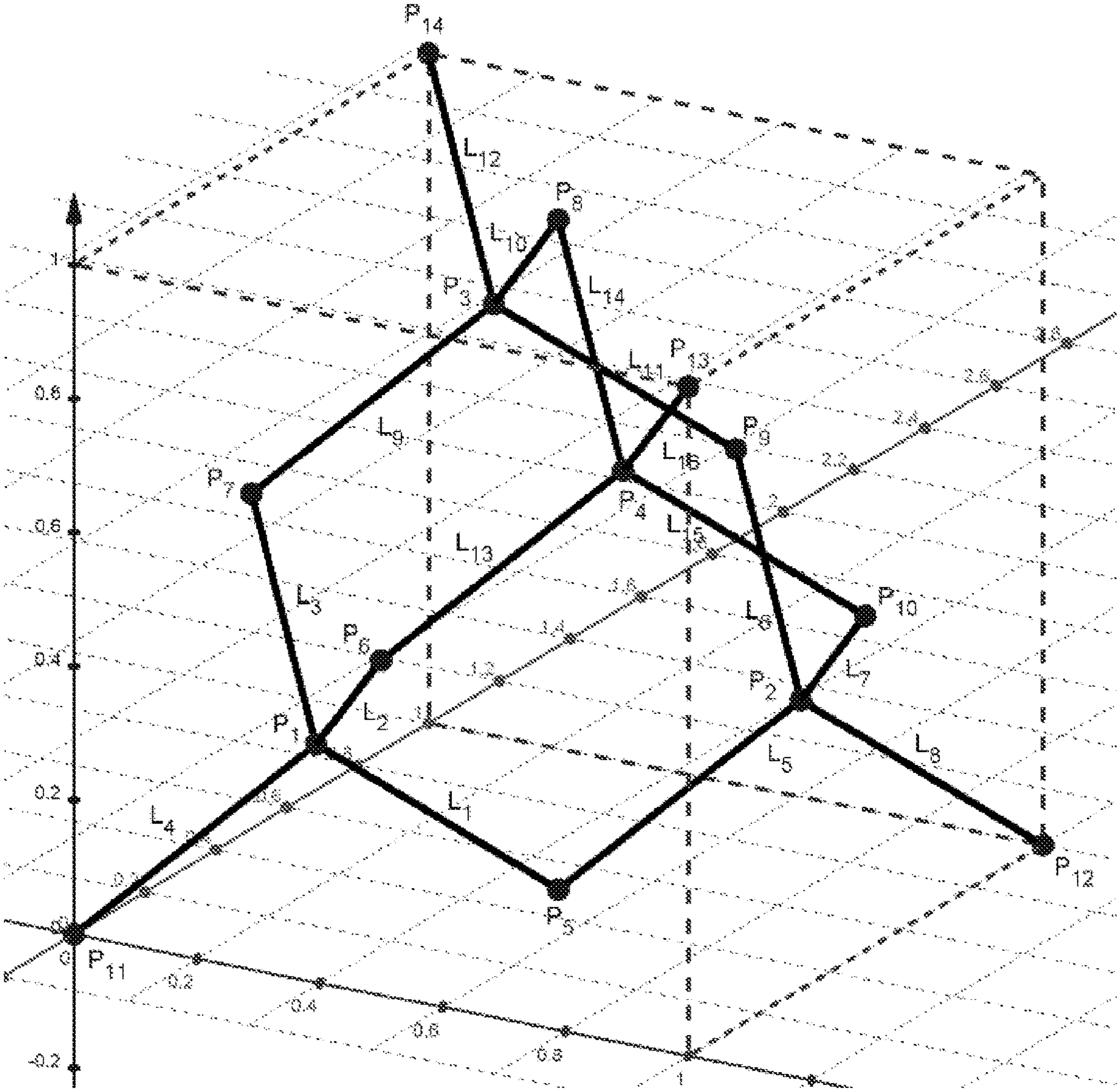
FIG. 4 is a specific structural diagram of a custom lattice.

The present invention is described in detail below with reference to the accompanying drawings and specific embodiments. This embodiment is implemented on the premise of the technical solution of the present invention, and provides detailed implementations and a specific operation process, but the protection scope of the present invention is not limited to the following embodiments.

As shown in FIG. 1, a perforation information processing method for a bone scaffold model is implemented in a manner of computer software, including:

step S1: Import a nonporous-bone-scaffold initial model, shown in FIG. 2, with a following coordinate range: X: [−46.9,−31.5], Y: [18.9,44.1], Z: [42.8,70.1];

step S2: segmenting the nonporous-bone-scaffold initial model into a plurality of unit lattices according to an input signal; and step S3: perforating each of the unit lattices, to obtain a porous bone scaffold model.

For a single unit lattice, step S3 specifically includes the following steps:

step S31: Draw a first quantity of short girders in the unit lattice, to form a porous lattice template, where the first quantity is received from an input device. Step S31 specifically includes:

step S311: Select a plurality of key points in a cube range from coordinates (0, 0, 0) to (1, 1, 1), where 14 key points are specified as follows in this embodiment;

$$P_1\left(\frac{1}{4},\frac{1}{4},\frac{1}{4}\right), P_2\left(\frac{3}{4},\frac{3}{4},\frac{1}{4}\right), P_3\left(\frac{1}{4},\frac{3}{4},\frac{3}{4}\right), P_4\left(\frac{3}{4},\frac{1}{4},\frac{3}{4}\right), P_5\left(\frac{1}{2},\frac{1}{2},0\right)$$

$$P_6\left(\frac{1}{2},0,\frac{1}{2}\right), P_7\left(0,\frac{1}{2},\frac{1}{2}\right), P_8\left(\frac{1}{2},\frac{1}{2},1\right), P_9\left(\frac{1}{2},1,\frac{1}{2}\right), P_{10}\left(1,\frac{1}{2},\frac{1}{2}\right)$$

$$P_{11}(0,0,0), P_{12}(1,1,0), P_{13}(1,0,1), P_{14}(0,1,1)$$

step S312: Create line segments between the generated key points, to form the short girders in the unit lattice, where 16 line segments are created as follows in this embodiment; and $$L_1=\overline{P_1P_5}, L_2=\overline{P_1P_6}, L_3=\overline{P_1P_7}, L_4=\overline{P_1P_{11}}, L_5=\overline{P_2P_5}, L_6=\overline{P_2P_9}$$

$$L_7=\overline{P_2P_{10}}, L_8=\overline{P_2P_{12}}, L_9=\overline{P_3P_7}, L_{10}=\overline{P_3P_8}, L_{11}=\overline{P_3P_9}, L_{12}=\overline{P_3P_{14}}$$

$$L_{13}=\overline{P_4P_6}, L_{14}=\overline{P_4P_8}, L_{15}=\overline{P_4P_{10}}, L_{16}=\overline{P_4P_{13}}$$

step S313: Check whether there is a key point, of which a connectivity is still 1 after the lattices are laid densely, among the key points generated in step S21 in the structural diagram of the line segments generated in step S22, and return to step S21 to regenerate key points if there is, otherwise, perform step S32.

Step S32: Generate equidistant sampling points according to a specified sampling pitch in a model space in which the nonporous-bone-scaffold initial model is located;

In this embodiment, the sampling pitch ΔL=0.1 is determined according to the model dimension ΔX=15.4, ΔY=25.2, ΔZ=27.3 of the nonporous-bone-scaffold initial model, a specified lattice dimension $L_{Lattice}$=2.5, and a specified short girder radius $R_{Girder}$=0.3.

Then, according to the determined sampling pitch ΔL=0.1, a total of N=13867104 sampling points are created in a sampling range X: [−47.9, −30.5], Y: [17.9,45.1], Z: [74.8,71.1] of the model space where the nonporous-bone-scaffold initial model is located.

Step S33: Calculate shortest distances between each of the sampling points and all the short girders. Step S33 specifically includes:

step S331: Scale a dimension of the unit lattice to a specified dimension, where in this embodiment, the dimension is enlarged from 1×1×1 to 2.5×25×25, and densely fill the scaled unit lattices in the model space;

step S332: Assign an initial value+∞ to distances $D_{XiYiZi}$ of the N sampling points generated in step S32 in a distance field;

step S333: traversing all lattices that are filled in step S331 and that possibly contribute to the shortest distances of the sampling points generated in step S3 in the distance field; and step S334: Traverse short girders in all the lattices traversed in step S333, use an OBBTree data structure to speed up a determination of a positional relationship between the short girder and the non-porous model designed in step S1, if the short girder is completely inside the nonporous-bone-scaffold initial model, update shortest distance values of sampling points in a specified range near the short girder, if a part of the short girder is inside the nonporous-bone-scaffold initial model, calculate the part of the short girder inside the nonporous-bone-scaffold initial model, and update the shortest distance values $D_{X,Y,Z}$ of the sampling points in a specific range nearby the part for the part.

Values in each region in step S334 are updated concurrently and independently.

Step S34: Use a Marching-Cubes algorithm to extract an isosurface of which a value is $R_{Girder}$=0.3 in the shortest distance values $D_{XiYiZi}$, that is, to obtain a final porous-bone-scaffold initial model.

What is claimed is:

1. A perforation information processing method for a bone scaffold model, comprising:

step S1: importing a nonporous-bone-scaffold initial model;

step S2: segmenting the nonporous-bone-scaffold initial model into a plurality of unit lattices according to an input signal; and step S3: perforating each of the unit lattices, to obtain a porous bone scaffold model, wherein for each unit lattice, step S3 comprises:

step S31: receiving, from an input device, a user-specified first quantity of short girders, and constructing the user-specified first quantity of short girders by:

selecting a plurality of key points within a cube range from coordinates (0, 0, 0) to (1, 1, 1), creating line segments between the selected key points to form the short girders, and determining, based on the created line segments, whether any of the selected key points is connected to only one line segment, and if so, regenerating the key points and repeating the creating step until each key point is connected to more than one line segment;

step S32: generating a plurality of sampling points that are distributed at equal intervals according to a specified sampling pitch in a model space in which the nonporous-bone-scaffold initial model is located;

step S33: calculating, for each sampling point, a shortest distance to the short girders by:

scaling a dimension of each unit lattice to a specified dimension and densely filling the scaled unit lattices throughout the model space in which the nonporous-bone-scaffold initial model is located;

initializing, for each sampling point, a distance value in a distance field to a predetermined maximum value representing an initial distance prior to distance computation; and traversing the short girders, wherein:

if a short girder is completely inside the nonporous-bone-scaffold initial model, the distance values of sampling points within a specified neighborhood of the short girder are updated based on distances to the short girder, and if a short girder is partially inside the nonporous-bone-scaffold initial model, a geometric portion of the short girder that lies inside the nonporous-bone-scaffold initial model is determined, and the distance values of sampling points within a specified neighborhood are updated based on distances to said portion;

wherein the distance values of the sampling points in different regions of the model space are updated concurrently and independently; and step S34: extracting, based on the distance values of the sampling points, an isosurface corresponding to a specified short girder radius using an isosurface extraction algorithm to perforate the unit lattices.

2. A perforation information processing device for a bone scaffold model, comprising:

a processor, a memory, and instructions stored in the memory and executable by the processor, wherein execution of the program instructions causes the processor to perform operations comprising:

importing a nonporous-bone-scaffold initial model;

segmenting the nonporous-bone-scaffold initial model into a plurality of unit lattices according to an input signal; and perforating each of the unit lattices, to obtain a porous bone scaffold model, wherein perforating each of the unit lattices comprises, for each unit lattice:

receiving, from an input device, a user-specified first quantity of short girders, and constructing the user-specified first quantity of short girders by:

selecting a plurality of key points within a cube range from coordinates (0, 0, 0) to (1, 1, 1), creating line segments between the selected key points to form the short girders, and determining, based on the created line segments, whether any of the selected key points is connected to only one line segment, and if so, regenerating the key points and repeating the creating step until each key point is connected to more than one line segment;

generating a plurality of sampling points that are distributed at equal intervals according to a specified sampling pitch in a model space in which the nonporous-bone-scaffold initial model is located;

calculating, for each sampling point, a shortest distance to the short girders by:

scaling a dimension of each unit lattice to a specified dimension and densely filling the scaled unit lattices throughout the model space in which the nonporous-bone-scaffold initial model is located;

initializing, for each sampling point, a distance value in a distance field to a predetermined maximum value representing an initial distance prior to distance computation; and traversing the short girders, wherein:

if a short girder is completely inside the nonporous-bone-scaffold initial model, the distance values of sampling points within a specified neighborhood of the short girder are updated based on distances to the short girder, and if a short girder is partially inside the nonporous-bone-scaffold initial model, a geometric portion of the short girder that lies inside the nonporous-bone-scaffold initial model is determined, and the distance values of sampling points within a specified neighborhood are updated based on distances to said portion;

wherein the distance values of the sampling points in different regions of the model space are updated concurrently and independently; and extracting, based on the distance values of the sampling points, an isosurface corresponding to a specified short girder radius using an isosurface extraction algorithm to perforate the unit lattices.

* * * * *